3,178,268
LIQUID TRANSPORT IN CONTINUOUS
EXTRACTION APPARATUS
Olle Lindström, Vasteras, Sweden, assignor to Allmanna
 Svenska Elektriska Aktiebolaget, Vasteras, Sweden, a
 corporation of Sweden
Filed Feb. 21, 1961, Ser. No. 90,867
Claims priority, application Sweden, Feb. 25, 1960,
1,893/60
8 Claims. (Cl. 23—270.5)

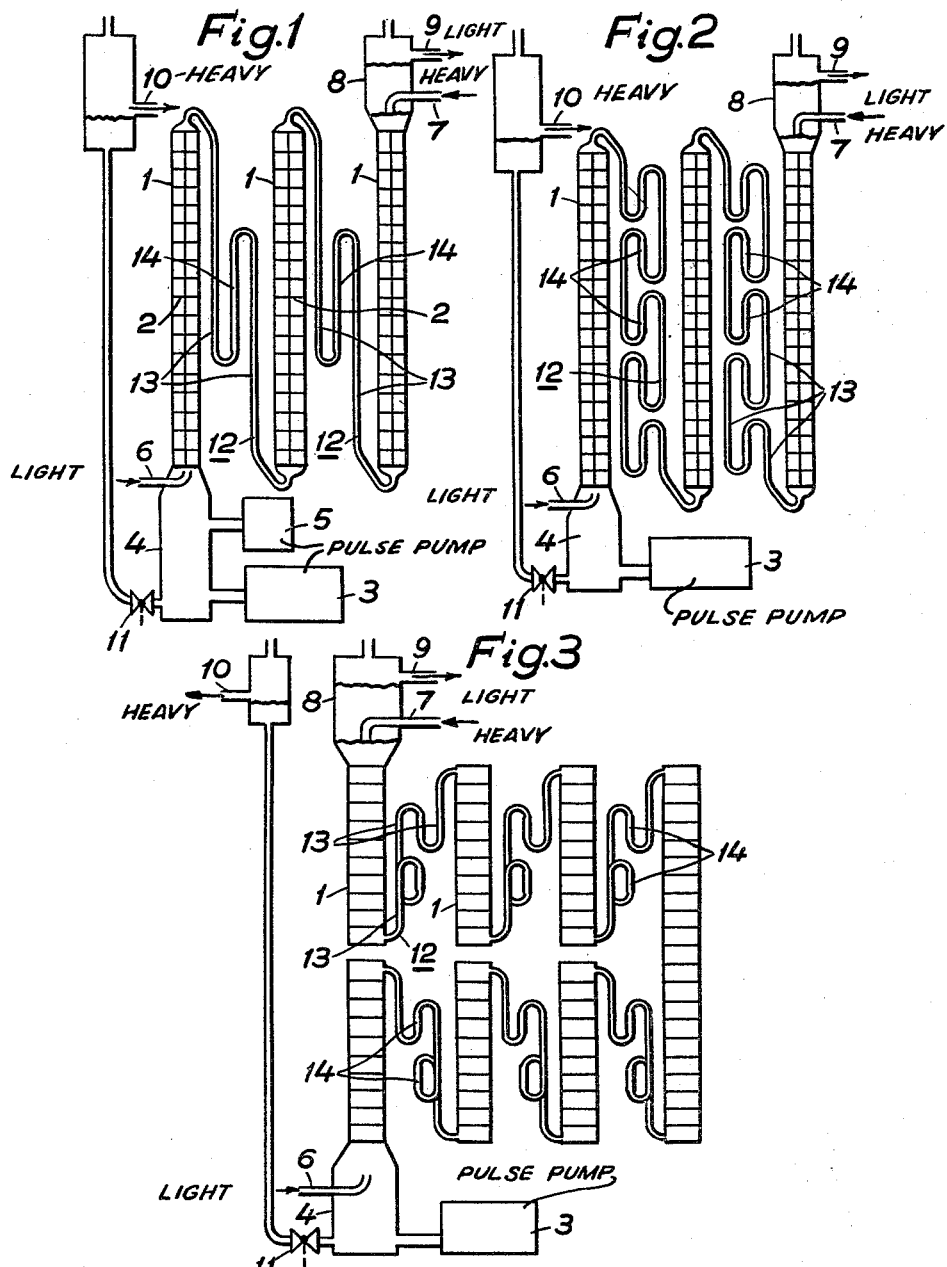

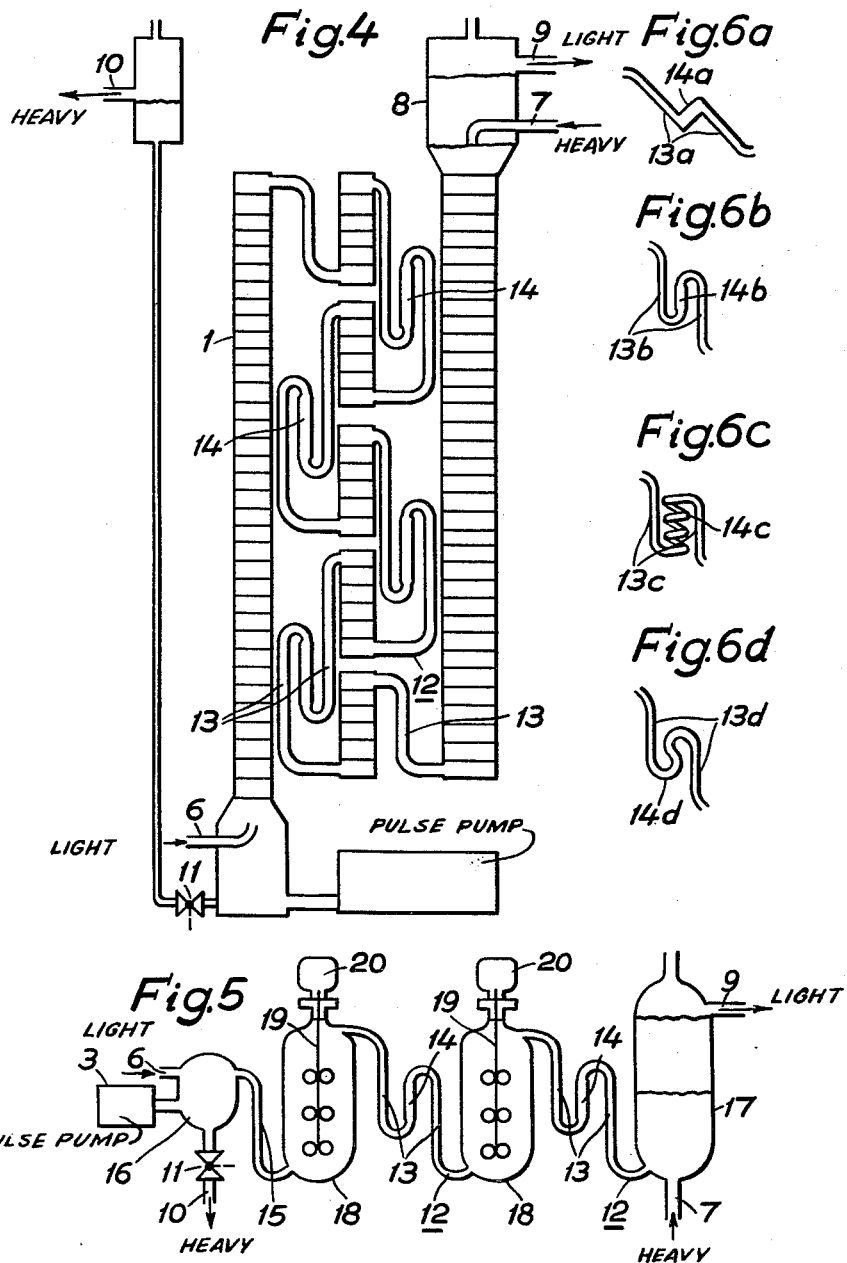

The present invention relates to means for liquid transport in continuous extraction apparatus, consisting of a number of vessels, for example, pulsed column elements connected to each other in series with connection pipes. The invention relates particularly to the method of performing the transport in the connection pipes and the shaping of these.

Liquid-liquid extraction is used to a considerable extent in the petroleum industry, but also in the nuclear energy industry, among other things, for processing the used nuclear fuel for the recovery of plutonium, uranium or thorium. The extraction process has had great success in purifying nuclear fuels, mainly because of the high decontamination effect.

For each extraction it is known to use apparatus comprising a number of separate vessels, often column elements, which are connected in series with connection pipes in such a way that the upper part of one vessel is connected by means of at least one connection pipe to the lower part of the next vessel, situated on a level below the mentioned upper part. The liquid phases are transported between the vessels with the help of a pulsing means, the pulse beat of which usually has comparatively large amplitude and comparatively low frequency. The volume in the connection pipe between two vessels is less than, or of the same magnitude as, the volume which is displaced in the connection pipe at one pulse beat (the pulse volume). Through the oscillating movement which the content of the connection pipes is subjected to, and because of the different density of the liquid phases, a net transport of the two liquid phases in countercurrent flow takes place through the extraction apparatus composed of the column elements. This is because at an upward pulse beat (in the vessel) the liquid which is enriched with the lighter phase is transferred via the connection pipe from the upper part of one vessel to the lower part of the next vessel and at a downward pulse beat (in the vessel) the liquid with lower concentration of light phase is transferred in the opposite direction from the lower part of the last mentioned vessel to the upper part of the first mentioned. In the described apparatus it has been assumed that each connection pipe consists of a substantially straight pipe. In an apparatus with a pulsing means, the pulsing brought about by this controls both the transport between the vessels and the extraction effect. Under such conditions, in a given apparatus, optimum conditions for both processes can only be obtained for certain pairs of liquids. In order to make the following description more tangible it is assumed that the vessels consist of column elements in a series connected pulsed column.

As far as extraction effect is concerned, a more favourable pulsing, i.e., a pulsing with less amplitude and higher frequency, can be brought about by means of different known possibilities. One such possibility is to give each connection pipe which decides the amplitude of the pulsing, a small volume. This can be done by giving the pipe a small diameter. However, the use of narrow pipes causes considerable drawbacks, particularly if the column elements are comparatively high. Thus, party the pressure drop in the pipes would be unsuitably great so that, among other things, it might be necessary to keep the whole system under pressure in order to prevent cavitation and partly there may arise, among other things, risk of emulsifying for many liquid systems, which means that the extraction effect as well as the column capacity would be reduced to such an extent that the whole extraction process would be ruined.

Another possibility for giving the connection pipes small volume is to make them short, which means that the column elements will also be short. The required column lengths are then divided into a great number of series connected column elements. Even if such a division does not necessarily cause a substantial increase in the floor surface required for the apparatus since the column elements could be arranged in several rows beside each other, adjustable in relation to each other in height and partly directly above each other, however, other drawbacks arise. Thus the manufacturing costs per column length will be greater than when using higher elements and further, the work in installing the apparatus will be more expensive.

In order to avoid an exaggerated division of the required column lengths into series connected column elements and thus make possible the use of relatively tall column elements without the connection pipes having to be made inconveniently narrow, another method of procedure is known to be suitable with pulsed columns. According to this, at least two pulsing means are used. One of these gives a pulsing which is adapted with respect to the transport process and which therefore has relatively large amplitude and relatively low frequency. At one pulse beat this pulsing displaces a volume which is larger than or of the same magnitude as the volume of each connection pipe. The other pulsing means gives a pulsing which is adapted with respect to the extraction process and which therefore has relatively small amplitude and relatively high frequency. The last named pulsing is superimposed on the previously mentioned transport-controlling pulsing.

By simultaneously making use of the possibility of dividing the required column lengths into a suitable number of series-connected column elements and the possibility of using pulsings for the transport and extraction processes which are independent of each other, great freedom as to dimensioning and construction of this particular type of extraction apparatus is obtained.

The present invention relates to a method of further increasing the freedom in dimensioning and constructing extraction apparatus and it enables available column elements or other vessels and pulsing means to be used to their full advantage. The invention relates to a method of carrying out a net transport of a light and heavy phase in countercurrent in a liquid-liquid extraction process by subjecting the liquids to a pulsing in an apparatus with a number of series-connected vessels, which are connected to each other by means of connection pipes in such a way that the upper part of the first of two adjacent vessels by means of at least one connection pipe is connected to the lower part of the next vessel, the mentioned lower part being situated on a level below the mentioned upper part, so that a mixture of the two liquid phases oscillates in the connection pipe. The invention is characterised in that this connection pipe, seen as leading from the upper part of the first vessel to the lower part of the second vessel, is made with alternately conduit elements directed downwards and conduit elements directed upwards and that the liquid mixture in the conduit element directed downwards is brought to oscillate to and fro between two conduit elements directed upwards, or between an adjoining conduit element directed upwards and an adjoining vessel, and in the conduit elements directed upwards, is brought to oscillate in such a way that a substantial part of the liquid mixture in each of them is transmitted at each pulse beat to an adjoining conduit element directed downwards. In order to carry out the method according to the invention a device is used in which the volume of each of the conduit elements directed downwards is less than or of the same magnitude as the volume which is displaced at one pulse beat within the connection pipe (pulse volume) and the volume of each conduit element directed upwards is substantially the same size as preferably half to double the volume which is displaced in the connection pipe at one pulse beat. By the expression the same magnitude is meant that each conduit element directed downwards can have the same or somewhat larger volume than the pulse volume. The fact that a transport may be brought about even if the nominal volume of each conduit element directed downwards is somewhat larger than the pulse volume is because the transport can to a relatively large extent take place in the central portion of the pipe, depending on the radial speed distribution. At pulsing, under these circumstances, a portion of the liquid oscillates through the whole conduit element, in spite of the fact that the nominal volume of the element is somewhat larger than the pulse volume, which means that a net transport of the liquid phases in respective directions takes place in reality through the conduit element. The nominal volume of a conduit element directed downwards suitably has a magnitude corresponding to half to the whole pulse volume, preferably a magnitude corresponding to 0.7–0.8 of the pulse volume. By making the connection pipes in this way with alternately conduit elements directed downwards and conduit elements directed upwards, the amplitude of the transport-controlling pulsing need not be such that the pulse volume is larger than or of the same magnitude as the volume of the complete connection pipe, but need only be larger than or of the same magnitude as the volume of each conduit element directed downwards. When only one pulsing means is used, the pulsing may be chosen only with regard to that the optimum pulsing conditions for the extraction process are obtained. By exchanging the previous substantially straight connection pipes in an apparatus already built, for the connection pipes according to the invention, while maintaining the same column elements and the same pulsing conditions, the pressure drop in the connection pipes may be reduced and thus the inconveniences caused by this may be reduced to a considerable extent. This is because the connection pipes according to the invention may be made larger while maintaining other conditions, since it is now the volume of each conduit element directed downwards as against previously the volume of the complete connection pipe which is in relation to the pulse volume in the transport-controlling pulsing. Since the pressure drop, among other things, is inversely proportional to the pipe diameter to the fourth, this is very important. Thus doubling the diameter of the pipe would mean a reduction in pressure drop of more than a power of 10.

It is suitable to allow the volume of each of the elements directed upwards to be the same size as the volume which is displaced through the connection pipe at one pulse beat. With larger volumes in these elements directed upwards, there is a risk of separation and stagnation in the elements, which would mean that transition zone or interface impurities could easily be deposited in them. Such a collection of impurities may easily cause the connection pipes to get blocked again and they would have to be cleaned which is a very big disadvantage, especially with extraction of radioactive materials. Since, according to the invention, the volume in the conduit elements directed upwards is so adapted that the liquid mixture therein is through oscillation all the time exchanged with the liquid mixture in adjoining conduit elements, a complete cleansing occurs and all impurities are transported further to the final separating vessel. For the same reason a separation of the liquid phases in the connection pipe is avoided so that a disturbance-free transport through them is obtained. By keeping down the volume of the conduit elements directed upwards, the total liquid content in the apparatus is kept down which, of course, is very important economically.

According to one embodiment of the invention, the conduit elements directed downwards and those directed upwards form parts of a bent pipe, which may be manufactured in one piece.

It is of course possible in an apparatus according to the invention to use not only a pulsing means which gives a pulsing with a frequency and amplitude adapted with respect to the liquid transport, but also one or several other pulsing means which give pulsings with frequency and amplitude adapted to the extraction effect. By simultaneously using a connection pipe according to the invention and pulsing means provided particularly for the extraction process, maximum flexibility is obtained for the extraction apparatus.

The upper part of one vessel need not be connected to the lower part of the next vessel by means of only one connection pipe, but it may even be connected by several parallel-connected conduits. Each connection pipe may also consist of parallel-connected conduit elements directed downwards and simple conduit elements directed upwards, or of simple elements directed downwards and parallel-connected elements directed upwards. The series-connected vessels need not be on the same level, but they could be adjustable in height in relation to each other. Certain vessels could even be situated directly above each other. The vessels need not be placed in one row, but could be installed in several rows close to each other.

The conduit elements directed downwards could themselves have different lengths, diameters and volumes. This is also true for the conduit elements directed upwards. The number of conduit elements in the different connection pipes in an extraction apparatus need not necessarily be the same. Of course the vessels themselves could also be different in shape as well as in length, diameter, volume.

The invention is more closely described with reference to the accompanying figures, which as examples show different arrangements for carrying out the method according to the invention.

FIGURE 1 shows schematically an arrangement with three column elements placed beside each other and two pulsing means. Each connection pipe has two conduit elements directed downwards and one conduit element directed upwards.

FIGURE 2 shows schematically an arrangement with three column elements placed beside each other and one pulsing means. Each connection pipe consists of several conduit elements directed downwards and several directed upwards.

FIGURE 3 shows schematically an arrangement which comprises column elements placed beside each other and one on top of the other. Each connection pipe consists of several conduit elements directed downwards and several directed upwards.

FIGURE 4 shows schematically another arrangement which comprises column elements placed beside each other and one on top of the other. Each connection pipe consists of two elements directed downwards and one directed upwards.

FIGURE 5 shows schematically an arrangement consisting of one pulsing means and four series-connected vessels, the first of which is an inflow vessel, the next two extraction vessels and the last a separating vessel.

FIGURES 6a–d show different embodiments of the connection pipes.

In FIGURES 1–4, the numeral 1 designates column elements, 2 perforated bottoms or plates. The plates could also be of another type, for example such manufactured of expanded metal. Instead of plates the column elements could have column packing. One or some of the column elements could also be made without plates or column packing. The pulsing means 3 which produces the transport-controlling pulsing is connected to the inflow end 4 for the light phase. Another pulsing means 5 with a pulsing adapted for the extraction process is similarly connected to this point in the apparatus. Each pulsing means may comprise, among other things, a piston pump or membrane pump where the valves have been removed. The light phase is supplied at 6 and the heavy at 7, i.e. in the separating vessel 8 at the other end of the column. The outflow for the light phase is at 9 and for the heavy phase at 10. The valve 11 regulates the outflow of the heavy phase so that the interface remains constant in the vessel 8. The connection pipes 12 consist of conduit element 13 directed downwards and conduit element 14 directed upwards.

In FIGURE 5 which shows an apparatus with a number of series-connected vessels, the designations from FIGURES 1–4 have been maintained for the devices corresponding to each other. The light phase is led in at 6 to the inflow vessel 16, from which the heavy phase which is led into the separating vessel 17, is withdrawn at 10. The extraction occurs mainly in the closed mixing vessels 18 which are provided with stirrers 19 driven by motors 20. The first connection pipe 15 is of previously known type, which is used in this vessel because the height of the inflow vessel 16 is lower than the mixing vessels 18.

FIGURE 6a shows an example of a connection pipe with relatively gentle slope on the conduit elements directed downwards. It is suitable to use this if the vessels are relatively far away from each other. The conduit element directed upwards, 14a, has a larger diameter than the one directed downwards, 13a. FIGURE 6b also shows an example of a connection pipe where the diameter of the conduit element directed upwards, 14b, is larger than the diameter of the one directed downwards, 13b. FIGURES 6c and 6d show examples of connection pipes consisting of pipes bent in a suitable manner. The elements directed upwards, 14c and 14d, have the same diameter as the ones directed downwards, 13c and 13d.

In the apparatus shown in FIGURE 2 the column elements 1 could, for a pilot plant apparatus, have a height of 960 mm. and a diameter of 50 mm. The plates 2 could be manufactured from stainless steel and each be perforated with 120 holes with a diameter of 2 mm., which gives a free area of 20.3%. The distance between the plates may be 25 mm. The connection pipes 12 comprise elements directed downwards 13 with a length of 350 mm. and a diameter of 15 mm. Each element directed downwards thus has a nominal volume of 62 cm.$^3$. Each element directed upwards has a height of 120 mm. and diameter of 27 mm., which gives a volume of 69 cm.$^3$. The pulsing means 3 may give a pulsing with the frequency 25 cycles/min. and the pulse volume 65 cm.$^3$. The pulsing means may be a conventional membrane pump. In the above described apparatus, for example, uranium may be extracted from a nitric acid uranium nitrate solution, containing 265 g. U/liter and 3 gram equivalents HNO$_3$/liter, with a solvent consisting of 30% tributyl phosphate and 70% photogen free from aromatic compounds. The first mentioned solution is supplied at 7 and the last mentioned at 6 in the apparatus according to FIGURE 2. The organic solvent containing the extracted uranium is withdrawn at 8 while the water phase flows out at 10.

Examples of other pairs of liquids which could be subjected to a net transport according to the invention are methyl isobutyl ketone (light phase) and water solutions of uranium salts (heavy phase), acetone (light phase) and water solutions of acetic acid (heavy phase), diethylether (light phase) and water solutions of uranium salts (heavy phase), dibutyl cellosolve (light phase) and water solutions of uranium salts (heavy phase), a benzene solution of thenyl trifluoracetone (light phase) and water (heavy phase), toluene (light phase) and water solutions of benzoic acid (heavy phase), etc.

I claim:
1. Apparatus for liquid-liquid extraction of a heavy phase and a light phase in countercurrent flow, said heavy phase and said light phase being substantially immiscible, comprising a plurality of vessels, means joining said vessels in series to provide for flow therethrough from one end to the other of the apparatus, inlet and outlet means for the heavy and light phases respectively each at one end of the apparatus, a pulsing means, said joining means including means connecting the upper part of the first of two consecutive vessels to the lower part of the second of such consecutive vessels, the lower part of the second vessel being located below the said upper part of the first vessel, said connecting means comprising at least one open connection line common to both phases, said line being capable of transmitting liquid in both directions and, in a direction leading from said upper part of said first vessel to said lower part of said second vessel, said line comprising at least two downwardly directed conduit elements and an upwardly directed conduit element between and connecting said downwardly directed conduit element the volume of each downwardly directed conduit element being no greater than approximately the volume which is displaced in said connection line at one stroke of said pulsing means for transmitting liquid through said connection line.

2. Apparatus as claimed in claim 1 in which the volume of each upwardly directed conduit element is between half and double the volume which is displaced in said connection line at one stroke of said pulsing means.

3. Apparatus for liquid-liquid extraction of a heavy phase and a light phase in countercurrent flow, said heavy phase and said light phase being substantially immiscible, comprising a plurality of vessels, means joining said vessels in series to provide for flow therethrough from one end of the apparatus to the other, inlet and outlet means for the heavy and light phases respectively at each end of the apparatus, a pulsing means, said joining means including means connecting the upper part of the first of two consecutive vessels to the lower part of the second of such consecutive vessels, the lower part of the second vessel being located below the said upper part of the first vessel, said connecting means comprising at least one open connection line common to both phases, said line being capable of transmitting liquid in both directions and, in a direction leading from said upper part of said first vessel to said lower part of said second vessel, said line comprising at least two downwardly directed conduit elements and an upwardly directed conduit element between and connecting said downwardly directed conduit element said downwardly and upwardly directed conduit elements forming parts of a bent pipe, the volume of each downwardly directed conduit element being no greater than approximately the volume which is displaced in said connection line at one stroke of said pulsing means for transmitting liquid through said connection line.

4. Apparatus as claimed in claim 3 in which the volume of each upwardly directed conduit element is between half and double the volume which is displaced in said connection line at one stroke of said pulsing means.

5. Apparatus for liquid-liquid extraction of a heavy phase and a light phase in countercurrent flow, said heavy phase and said light phase being substantially immiscible, comprising a plurality of vessels, means joining said vessels in series to provide for flow therethrough from one end of the apparatus to the other, inlet and outlet means for the heavy and light phase respectively at each end of the apparatus, a first pulsing means, said joining means including means connecting the upper part of the first of two consecutive vessels to the lower part of the second vessel, the lower part of the second vessel being located below the said upper part of the first vessel, said connecting means comprising at least one open connection line common to both phases, said line being capable of transmitting liquid in both directions and, in a direction leading from said upper part of said first vessel to said lower part of said second vessel, said line comprising at least two downwardly directed conduit elements and an upwardly directed conduit element between and connecting said downwardly directed conduit element the volume of each downwardly directed conduit element being no greater than approximately the volume which is displaced in said connection line at one stroke of said first pulsing means for transmitting liquid through said connection line, and a second pulsing means having a substantially higher frequency and a lower amplitude than said first pulsing means for increasing the extraction efficiency of the extraction apparatus, said first pulsing means primarily producing transfer of the phases between the vessels and said second pulsing means primarily improving the extraction.

6. Apparatus as claimed in claim 5 in which the volume of each upwardly directed conduit element is between half and double the volume which is displaced in said connection line at one stroke of said first pulsing means.

7. Apparatus for liquid-liquid extraction of a heavy phase and a light phase in countercurrent flow, said heavy phase and said light phase being substantially immiscible, comprising a plurality of vessels, means joining said vessels in series to provide for flow therethrough from one end of the apparatus to the other, inlet and outlet means for the heavy and light phase respectively at each end of the apparatus, a first pulsing means, said joining means including means connecting the upper part of the first of two consecutive vessels to the lower part of the second vessel, the lower part of the second vessel being located below the said upper part of the first vessel, said connecting means comprising at least one open connection line common to both phases, said line being capable of transmitting liquid in both directions and, in a direction leading from said upper part of said first vessel to said lower part of said second vessel, said line comprising at least two downwardly directed conduit elements and an upwardly directed conduit element between and connecting said downwardly directed conduit element said downwardly and upwardly directed conduit elements forming parts of a bent pipe, the volume of each downwardly directed conduit element being no greater than approximately the volume which is displaced in said connection line at one stroke of said first pulsing means for transmitting liquid through said connection line, and a second pulsing means having a substantially higher frequency and a lower amplitude than said first pulsing means for increasing the extraction efficiency of the extraction apparatus, said first pulsing means primarily producing transfer of the phases between the vessels and said second pusing means primarily improving the extraction.

8. Apparatus as claimed in claim 7 in which the volume of each upwardly directed conduit element is between half and double the volume which is displaced in said connection line at one stroke of said first pulsing means.

References Cited by the Examiner

UNITED STATES PATENTS

| | | | |
|---|---|---|---|
| 2,667,407 | 1/54 | Fenske | 208—317 |
| 2,729,550 | 1/56 | Maycock | 260—705 |
| 2,811,423 | 10/57 | Bradley | 23—270.5 |
| 2,895,808 | 7/59 | Hartley | 23—270.5 |
| 3,085,864 | 4/63 | Jealous | 23—270.5 |

OTHER REFERENCES

Jealous et al. (Chemical Engineering Progress), September 1956, vol. 52, No. 9, pages 366–370.

Sege et al. (Chemical Engineering Progress), August 1954, page 396, Fig. 1, vol. 50, No. 8.

NORMAN YUDKOFF, *Primary Examiner.*

JAMES H. TAYMAN, *Examiner.*